United States Patent [19]

Hayes

[11] E Re. 30,794

[45] Reissued Nov. 17, 1981

[54] HAND SCRAPER

[75] Inventor: Robert R. Hayes, Euclid, Ohio

[73] Assignee: Oatey Co., Cleveland, Ohio

[21] Appl. No.: 193,731

[22] Filed: Oct. 3, 1980

Related U.S. Patent Documents

Reissue of:

[64] Patent No.: 4,178,663
Issued: Dec. 18, 1979
Appl. No.: 933,501
Filed: Aug. 14, 1978

[51] Int. Cl.[3] ..... B23D 71/00; B23D 71/04; B24D 15/04

[52] U.S. Cl. ..... 29/78; 29/80; 51/392

[58] Field of Search ..... 29/78, 80; 51/392, 393

[56] References Cited

U.S. PATENT DOCUMENTS

| | | | |
|---|---|---|---|
| 490,474 | 1/1893 | Faestl | 29/80 |
| 643,717 | 2/1900 | Ingalsbe | 29/78 |
| 644,020 | 2/1900 | Ludwig | 29/80 |
| 696,177 | 3/1902 | Huffstickler | 29/80 |
| 4,137,670 | 2/1979 | Goralski | 51/392 |

*Primary Examiner*—Harrison L. Hinson
*Attorney, Agent, or Firm*—Maky, Renner, Otto & Boisselle

[57] ABSTRACT

Hand-held scraper includes a body or holder portion to which is removably secured a scraping or cutting blade. The blade is retained in place by camming the mounting tabs at its respective ends into tight frictional locking engagement with a pair of longitudinally spaced apart retaining ribs protruding downwardly in opposite outwardly disposed directions from the underneath side of the holder portion. At least one of the retaining ribs is somewhat flexible to facilitate camming of the blade into and out of assembled engagement with the holder portion with little or no flexing of the mounting tabs and no bending or yielding of the blade body whatsoever. To facilitate removal and replacement of the blade, a movable lever is provided on the underneath side of the holder portion inwardly of one of the mounting tabs. When the lever is manually pushed downwardly, the lever presses against such mounting tab, causing it to cam away from the associated mounting rib thus freeing the blade from the holder.

20 Claims, 10 Drawing Figures

HAND SCRAPER

Matter enclosed in heavy brackets [ ] appears in the original patent but forms no part of this reissue specification; matter printed in italics indicates the additions made by reissue.

BACKGROUND OF THE INVENTION

The present invention relates generally as indicated to a hand scraper, and more particularly, to a relatively simple and inexpensive holder for positively retaining a scraping or cutting blade in place on the scraper during use and yet permitting the blade to be changed with relative ease as desired without having to use any tools and the like. The blade may be a conventional type file blade having upturned mounting flanges or tabs at opposite ends thereof with partially inturned end portions.

Conventionally, file blades are secured to holders by screws to the underneath of the file holder as shown, for example, in U.S. Pat. Nos. 2,839,817 and 3,531,841. The use of such screws not only adds to the cost of the device, but also greatly increases the amount of time required to change blades, and are subject to being damaged or causing damage during use of the tool and of being misplaced or lost. There are other known types of holders that do not use screws but do use specially shaped blades or mounting hooks to secure the blades in place. Such blades are not only more costly, but are also somewhat difficult to assemble and disassemble, and of course such blades are not readily adaptable for use with different holders and the like. An example of a specially constructed blade which has a pronounced natural curvature, requiring the degree of curvature to be reduced during assembly to place the blade in a stressed condition for urging the blade into constant secure retention on the support is shown in U.S. Pat. No. 3,829,942. U.S. Pat. No. 2,663,070 shows a blade with an inturned hook at one end and a specially formed snap hook at the other end which is used with a holder having a plane bottom length greater than the distance between the two hooks so that when the inturned hook is secured to the holder, the snap hook will exert pressure and tightly secure the file blade to the holder.

SUMMARY OF THE INVENTION

With the foregoing in mind, it is a principal object of this invention to provide an improved blade holder for securely retaining the blade in place during use while permitting the blade to be changed with relative ease without the need for any tools and the like.

Another object is to provide such a holder for use with conventional type file blades having standard upturned mounting flanges or tabs at opposite ends with partially inturned end portions.

Still another object is to provide such a holder in which the blade may be easily cammed into locking engagement with a pair of retaining ribs on the underside of the holder and just as easily cammed out of engagement with one of the retaining ribs thus freeing the blade from the holder to permit removal and replacement of the blade as desired.

These and other objects of the present invention may be achieved by providing suitable cam surfaces on the retaining ribs on the underneath side of the blade holder or camming engagement by the blade mounting flanges. At least one of the retaining ribs is desirably somewhat flexible to facilitate camming of the associated blade mounting flange into and out of assembled engagement with the holder with little or no flexing of the mounting tabs and no bending or yielding of the body of the blade. For ease of removal and replacement of the blade, a movable lever is provided on the underneath side of the holder portion inwardly of one of the mounting tabs. When the lever is manually pushed downwardly, it presses against such one mounting tab causing such mounting tab to cam away from the associated retaining rib, thus freeing the blade from engagement with the holder.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figure 1:
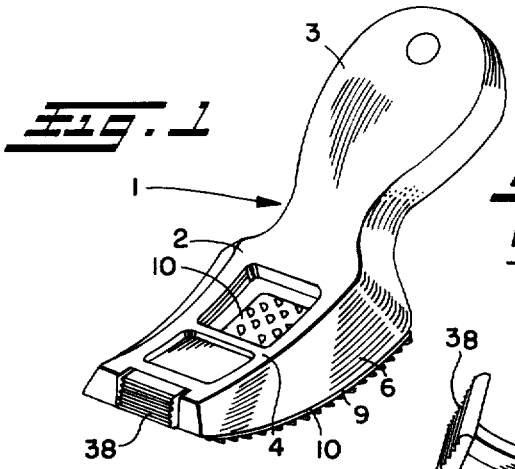
FIG. 1 is a perspective view of a preferred form of scraper tool in accordance with the present invention having a blade type file attached thereto.
Figure 2:
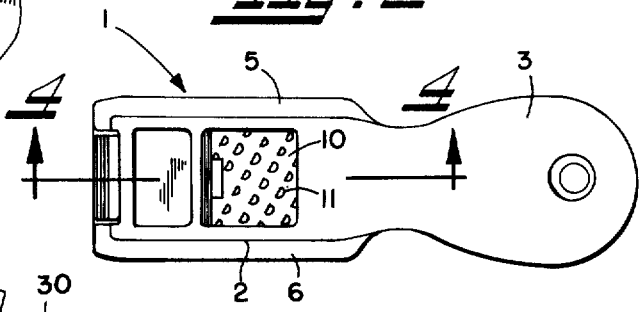
FIG. 2 is a top plan view of the tool of FIG. 1.

Referring now in detail to the drawings and initially to FIGS. 1 through 4, the hand scraper tool 1 of the present invention generally comprises a main body or holder portion 2 and a handle 3 integral therewith, such handle desirably extending at an angle therefrom. The holder portion 2 shown has a generally curvilinear top surface 4 with downwardly depending side walls 5, 6 defining an interior cavity 7 opening downwardly. The lowermost edges 8, 9 of the side walls 5, 6 desirably have a slight convex curvature from front to rear, and the scraper blade 10 which is to be used therewith has a substantially corresponding longitudinal curvature so that the blade will be adequately supported by the holder side walls when the blade is attached thereto with the blade spanning the cavity both crosswise and from front to rear.

The blade 10 itself may be of any standard type, for example, of the type shown in U.S. Pat. No. 3,509,611, including a plurality of rows of cutting edges 11, and being either substantially flat or slightly rounded in transverse section across the width of the blade. The actual number, spacing, and configuration of the cutting edges may vary depending on its intended use and whether the blade is to be used on such different materials as wood, plastic, or soft metal; also whether the blade is to be used principally for planing, shaping or shaving such material. At opposite ends 12, 13 of the blade, there are provided conventional generally upturned mounting flanges or tabs 14, 15 with partially inturned end portions which are used to secure the blade to the holder, in a manner to be subsequently described. The mounting tabs, which are of reduced width and generally centered relative to the width of the blade, may be formed integrally with the blade, or separate mounting tabs may be welded or otherwise secured to the ends of the blades as desired.

Suspended from the underneath side of the holder top portion 4 and within the interior cavity 7 are a pair of longitudinally spaced transversely extending blade retaining ribs 20, 21. As clearly shown in FIGS. 4, 6 and 10, such retaining ribs are oppositely angularly disposed, extending downwardly and outwardly at opposite ends of the holder portion, and having respective oppositely outwardly tapered camming surfaces 22, 23 on their axial outermost faces for camming engagement by the respective blade mounting tabs 14, 15. The longitudinal spacing between the blade mounting tabs 14, 15 is somewhat less than the spacing between the retaining ribs on the holder, and at least one of the retaining ribs, preferably the front retaining rib 20, is made somewhat flexible as by slotting the rib 20 as at 25, 26, 27 (see FIG. 5) to permit slight inward flexing movement of the front retaining rib during camming of the front blade mounting tab 14 onto the front retaining rib after hooking the rear mounting tab 15 over the rear retaining rib. The mounting tabs may also flex slightly during such assembly operation, but not the blade body, which may be made from relatively hard, heat treated sheet metal for long life. The scraper tool itself, on the other hand, is preferably a one piece molding made of a suitable plastic such as high impact styrene or polypropylene having the required rigidity and strength, with the required amount of flexibility or give to one or both of the integral mounting ribs being obtained by controlling the thickness thereof and by slotting.

In the assembled condition, the cutting edges of the blade desirably face to the rear as shown so that the cutting or scraping action occurs as the tool is drawn to the rear toward the operator by pulling on the handle. The rear blade retaining rib 21, being relatively rigid, securely retains the blade in place despite such pulling action.

Figure 10:
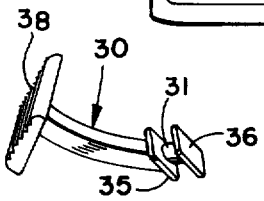
FIG. 10 is an enlarged fragmentary longitudinal section through the tool holder, similar to FIG. 4, but showing the blade release lever moved downwardly to disengage the blade from the holder.
Figure 5:
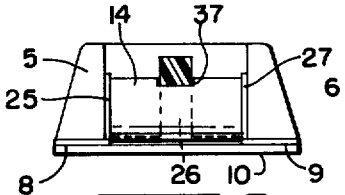
FIG. 5 is a transverse section through the forward end of the holder of FIG. 4, taken on the plane of the line 5—5 thereof.
Figure 4:
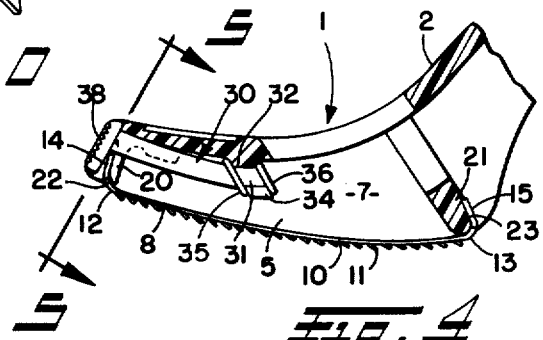
FIG. 4 is an enlarged fragmentary longitudinal section through the body or holder portion of the tool.
Figure 7:
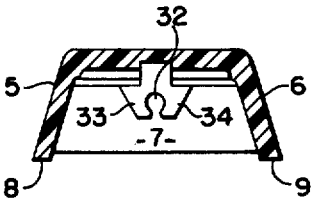
FIG. 7 is a transverse section through the holder portion of FIG. 6, taken on the plane of the line 7—7 thereof.
Figure 3:
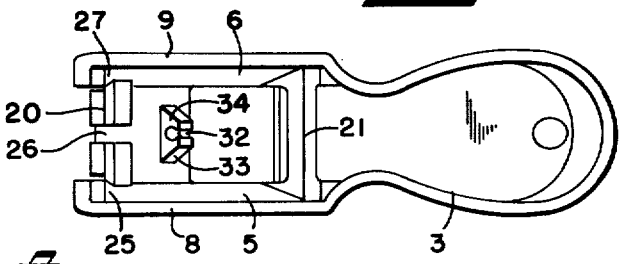
FIG. 3 is a bottom plan view of the tool of FIG. 1, but with the blade removed.
Figure 6:
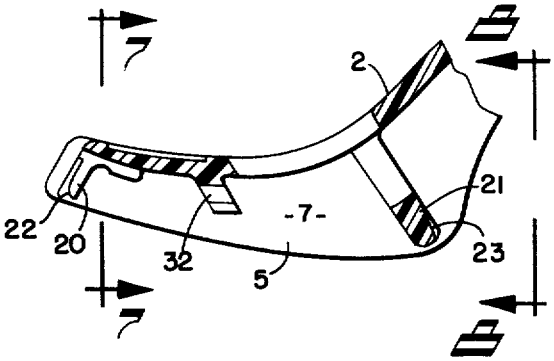
FIG. 6 is an enlarged fragmentary longitudinal section through the tool holder portion, similar to FIG. 4, but with the blade and blade release lever removed.
Figure 8:
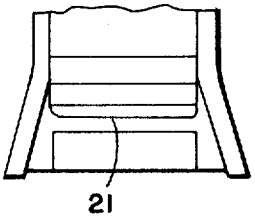
FIG. 8 is a fragmentary end view of the holder portion of FIG. 6 as seen from the plane of the line 8—8 from the right end thereof.
Figure 9:
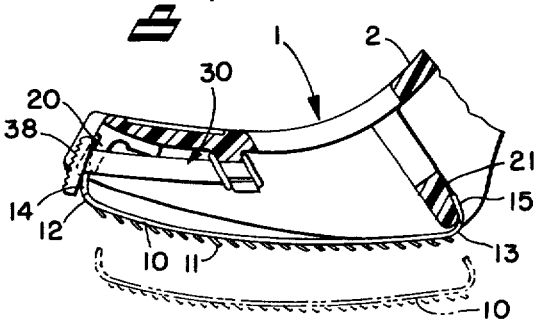
FIG. 9 is a perspective view of the blade release lever.

To facilitate removal and replacement of the blade from the holder, a movable lever 30 is desirably provided on the underneath side of the holder portion. As clearly shown in FIGS. 4, 9 and 10, the lever is desirably formed as a one piece molded part from a suitable plastic such as styrene or polypropylene and having a relatively short annular section 31 at the inner end thereof for snapping engagement into a recess 32 formed by a pair of molded fingers 33, 34 on the underneath side of the holder portion intermediate the retaining ribs 20, 21. Spaced apart flanges 35, 36 adjacent opposite ends of the annular section 31 assist in retaining such annular section within the recess. The lever 30 extends forwardly from the interior mount through the central vertical slot 26 in the front retaining rib 20 and a correspondingly aligned slot 37 in the upper edge of the front blade mounting tab 14 for guiding thereby. A serrated flange 38 or the like is provided at the outer end of the lever outwardly of the front retaining rib. As shown in FIGS. 4 and 5, when the tool is fully assembled with the cutting blade in place retained by the retaining ribs, the lever 30 is out of engagement with the forwardmost mounting tab, or at least does not interfere with its full engagement with the front retaining rib. However, a simple downward pressure applied to the exposed face 38 of the lever using thumb pressure and the like will cause the lever to flex slightly downwardly pressing against the front mounting tab to cam it away from the associated mounting rib thus freeing the blade from the holder as shown in FIG. 10.

From the foregoing, it will now be apparent that the hand scraper tool of the present invention includes a relatively simple and inexpensive mechanism for securely retaining the blade in place during use while permitting the blade to be removed and replaced with relative ease without the use of any tools and the like.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

[I claim] *The embodiments of the invention in which an exclusive property or privilege is claimed are defined as follows:*

1. A tool holder for a scraping or cutting blade having mounting tabs at opposite ends thereof, said tool holder comprising a body portion having a pair of longitudinally spaced transversely extending blade retaining ribs thereon, said ribs being oppositely angularly disposed and extending downwardly and outwardly from the underneath side of said body portion, the longitudinal spacing between said retaining ribs being slightly greater than the spacing between the mounting tabs on the blade, at least one of the retaining ribs being somewhat flexible to permit slight inward flexing of said one retaining rib during assembly of the blade mounting tabs onto said retaining ribs for retaining the blade on said tool holder.

2. The tool holder of claim 1 wherein said body portion includes a top wall and downwardly depending side walls defining an interior cavity containing said blade retaining ribs, such blade mounting tabs being adapted to be received in said cavity for engagement with said retaining ribs.

3. The tool holder of claim 2 wherein the lowermost edges of said side walls have a slight convex curvature, and the blade has a substantially corresponding longitudinal curvature so that the lowermost edges of said side walls fully support the blade when attached to said tool holder with the blade spanning said cavity.

4. The tool holder of claim 1 wherein said retaining ribs have oppositely outwardly tapered camming surfaces for camming engagement by the respective blade mounting tabs.

5. The tool holder of claim 4 wherein said tool holder consists of a one piece plastic molded part.

6. The tool holder of claim 5 wherein said one retaining rib is vertically slotted to impart the desired flexibility thereto.

7. The tool holder of claim 1 further comprising movable lever means on the underneath side of said body portion engageable with one of the blade mounting tabs when the blade is assembled on said tool holder upon application of downward pressure to said lever means to cam said one blade mounting tab away from the associated mounting rib thus freeing the blade from said tool holder.

8. The tool holder of claim 7 wherein said lever means includes means at one end for attachment to the underneath side of said body portion and an exposed face at the other end outwardly of said body portion for pressure engagement by the hand of the user, said lever means extending through a vertical slot in one of said retaining ribs for guiding thereby during movement into engagement with the upper edge of said one blade mounting tab.

9. The tool holder of claim 8 wherein said lever means is sufficiently flexible to permit the required movement thereof.

10. The tool holder of claim 9 wherein said lever means is a one piece plastic molded part, and means are provided both on said one end of said lever means and on the underneath side of said body portion to provide a snap connection between said lever means and said body portion.

11. The tool holder of claim 8 wherein the upper edge of said one blade mounting tab is also slotted for receipt of said lever means therein.

12. In combination, a tool holder and a scraping or cutting blade having mounting tabs at opposite ends thereof, said tool holder comprising a body portion having a pair of longitudinally spaced transversely extending blade retaining ribs thereon, said ribs being oppositely angularly disposed and extending downwardly and outwardly from the underneath side of said body portion, the longitudinal spacing between said retaining ribs being slightly greater than the spacing between said blade mounting tabs, at least one of said retaining ribs being somewhat flexible to permit slight inward flexing of said one retaining rib when engaged by the associated blade mounting tab during assembly of said blade on said tool holder, said retaining ribs having oppositely outwardly tapered camming surfaces for camming engagement by the respective blade mounting tabs, said one retaining rib being vertically slotted and made of a suitable plastic material to impart the desired flexibility thereto, and movable lever means on the underneath side of said body portion engageable with one of said blade mounting tabs when said blade is assembled on said tool holder upon application of downward pressure to said lever to cam said one blade mounting tab away from the associated retaining rib thus freeing said blade from said tool holder.

13. The combination of claim 12 wherein said lever means includes means at one end for attachment to the underneath side of said body portion and an exposed face at the other end outwardly of said body portion for pressure engagement by the user, said lever means extending through a vertical slot in one of said retaining ribs for guiding thereby during movement into engagement with the upper edge of said one blade mounting tab.

14. The combination of claim 13 wherein said lever means is a one piece plastic molded part having sufficient flexibility to permit the required movement thereof, and the upper edge of said one blade mounting tab is also slotted for receipt of said lever means therein.

*15. A tool holder for a scraping or cutting blade having mounting tabs at opposite ends thereof, said tool holder comprising a body portion having a pair of longitudinally spaced transversely extending blade retaining ribs thereon, said retaining ribs being engageable by the blade mounting tabs for retaining the blade on the tool holder, and movable lever means on the underneath side of said body portion engageable with one of the blade mounting tabs when the blade is assembled on said tool holder upon application of downward pressure to said lever means to disengage said one blade mounting tab from the associated mounting rib thus freeing the blade from said tool holder.*

*16. The tool holder of claim 15 wherein said lever means includes means at one end for attachment to the underneath side of said body portion and an exposed face at the other end outwardly of said body portion for pressure engagement by the hand of the user, said lever means extending through a vertical slot in one of said retaining ribs for guiding thereby during movement into engagement with the upper end of said one blade mounting tab.*

*17. The tool holder of claim 16 wherein said lever means is a one piece plastic molded part having sufficient flexibility to permit the required movement thereof, and the upper edge of said one blade mounting tab is also slotted for receipt of said lever means therein.*

*18. The tool holder of claim 16 wherein means are provided both on said one end of said lever means and on the underneath side of said body portion to provide a snap connection between said lever means and said body portion.*

*19. The tool holder of claim 15 wherein said retaining ribs have oppositely outwardly tapered camming surfaces for camming engagement by the respective blade mounting tabs.*

*20. The tool holder of claim 15 wherein at least one of said retaining ribs or said blade is somewhat flexible to permit slight flexing during assembly of said blade on said tool holder and disassembly therefrom.*

* * * * *